June 14, 1960   D. K. APPLEBY   2,940,765
DRILL HOLDER
Filed June 27, 1957
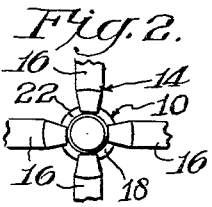
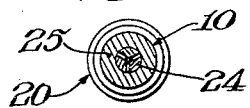
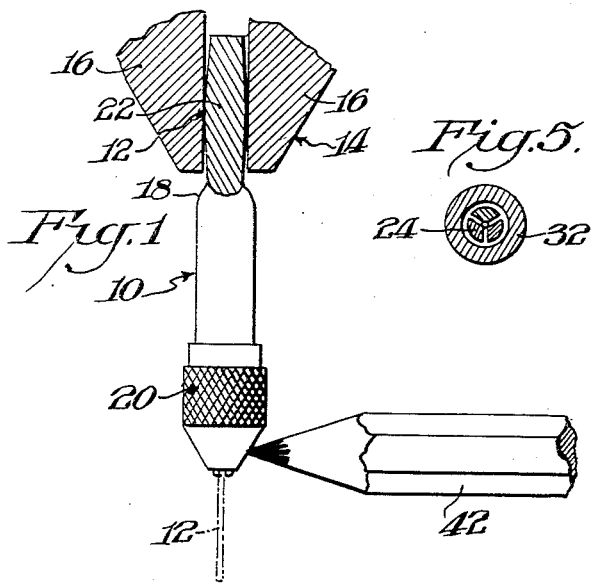
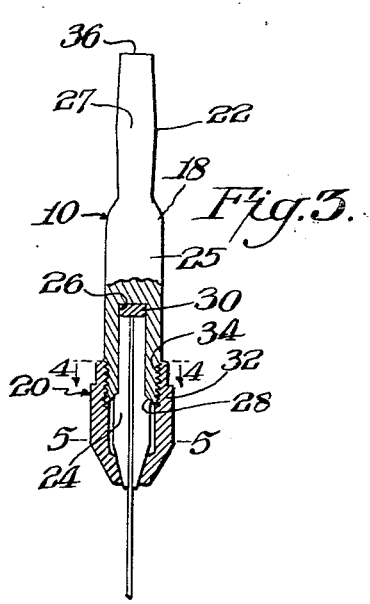
 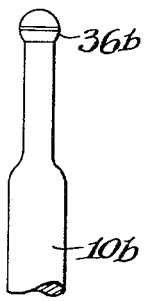 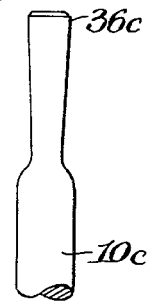  
INVENTOR
David K. Appleby
BY Connolly and Hutz
ATTORNEY

United States Patent Office 2,940,765
Patented June 14, 1960

2,940,765
DRILL HOLDER

David K. Appleby, Penn Acres, Del., assignor to Enterprise Machine and Development Corporation, New Castle, Del., a corporation of Delaware Filed June 27, 1957, Ser. No. 668,404

15 Claims. (Cl. 279—16)

This invention relates to a holder for small diameter drills, and more particularly relates to a holder for mounting and centering micro drills in the rotating holder of a drill press.

The term "micro drill" is used to designate a small diameter drill, for example, ranging from approximately 1/64 of an inch in diameter down to 0.001 of an inch in diameter. These micro drills are, for example, conventionally designated by 0.001 inch diameter sizes. A drill of any size tends to wobble or rotate eccentrically within the rotating holder or chuck of a drill press by virtue of the inherent inaccuracies incorporated in standard bearings, shafts and holding devices. This problem assumes major proportions in using micro drills where the eccentricity is of an order equal to and sometimes larger than the diameter of the drill itself. Means must, therefore, be provided for centering the drill in the rotating holder.

Various floating or self-aligning tool holders have been proposed. These devices, however, usually include a multiplicity of precisely manufactured and assembled parts. Examples of these prior art devices are described in U.S. Letters Patents 2,297,064, 2,432,350, and 2,778,647.

An object of this invention is to provide a simple and economical device for mounting and centering a standard micro drill in a conventional rotating holder.

In accordance with this invention, a device for mounting and centering a micro drill in a rotating holder includes a shank having a micro drill chuck disposed at one end. A circumferential protuberance is formed adjacent the other end of the shank which is inserted into the rotating holder. This protuberance provides sufficient area of contact between the shank and the rotating holder to drive the micro drill under load, and it projects outwardly from the rest of the shank a distance sufficient to permit the device to pivot about it within the rotating holder to center the drill upon he application of a lateral drill centering force to the lower end of the device.

Novel features and advantages of this invention will become apparent to one skilled in the art from a reading of the following description in conjunction with the accompanying drawings wherein similar reference characters refer to similar parts and in which:

Fig. 1 is a view in elevation of an embodiment of this invention;

Fig. 2 is a plan view of the embodiment shown in Fig. 1;

Fig. 3 is a cross-sectional view in elevation of the embodiment shown in Fig. 1;

Fig. 4 is a cross-sectional view taken through Fig. 3 along the line 4—4;

Fig. 5 is a cross-sectional view taken through Fig. 3 along the line 5—5; and

Figs. 6–10 are views in elevation of modifications of the embodiment shown in Fig. 1.

In Figs. 1 and 2 is shown a device 10 for mounting and centering a micro drill 12, for example, a long slender micro drill of the type usually described as a wire drill, in a rotating holder 14, for example, between jaws 16 of a conventional four-jawed chuck 14. Device 10 includes a shank 18 with a micro drill chuck 20 disposed at one end, and a circumferential protuberance 22 disposed at the other end.

Figs. 3–5 show details of device 10. Micro chuck 20, for example, is a collet type chuck including, for example, a three-jawed spring collet assembly 24 disposed within a central bore or recess 26 extending through the lower end 28 of a larger diameter section 25 of shank 18. Section 25 is sufficiently large in diameter to receive collet assembly shank 30 within it and to provide coupling means, threads 34 for example, for attaching collet closing ring 32. The diameter of section 25 is, for example, 9/16 inch to engage standard micro drill chucks. Collet type chuck 20 is a conventional type, but it might be replaced by any conceivable device for securely holding a micro drill. The term "chuck" is, therefore, used herein to designate any and all types of drill holding devices.

Smaller diameter section 27 of shank 18 remote from chuck 20 includes a circumferential protuberance 22. Protuberance 22 is disposed, for example, approximately at the center of section 27 which tapers gradually down on both sides of protuberance 22 to smaller diameters at end 36 and at neck 38 which joins the larger diameter section 25. The diameter of protuberance 22 is large enough to be conveniently grasped within the jaws 16 of rotating holder 14. It projects outwardly from the rest or root of the shank a distance sufficient to permit the device to pivot about it within the jaws upon the application of a lateral centering force to the lower portion of the device, for example, to a smooth portion of chuck 20. The diameter of protuberance 22 should be somewhat larger than the diameter of the largest micro drill size, namely, approximately somewhat larger than 1/64 inch to provide a convenient and strong configuration. An effective protuberance is, for example, formed at the center of section 27 which is approximately 1/2 inch long. The diameter at protuberance 22 is, for example, approximately 5/32 of an inch, and shank section 27 tapers gradually from it to a root diameter at end 36 and neck 38 which is, for example, approximately 1/8 inch.

Device 10 should be long enough to permit a micro drill held by it to become centered even if device 10 wobbles or runs eccentrically at its protuberance. An overall length of approximately 1½ inches is convenient and operative.

It is advantageous to make the taper of the smaller diameter section of the shank sufficiently shallow to prevent it from passing between the areas of contact provided by the jaws 16 of rotating holder 14 when the device is rocked about protuberance 22. This limits the extent of the rocking motion and prevents the chuck from inadvertently passing out of control when it is being trued up. When protuberance 22 is approximately 5/32 inch in diameter, a taper to a 1/8 inch diameter root within 1/4 inch of length is sufficiently shallow to maintain control.

To illustrate that protuberance 22 may be formed in an almost infinite variety of shapes, a number of variations are shown in Figs. 6–10. Figs. 6, 7 and 8 show protuberances formed adjacent the ends 36a, 36b and 36c respectively of devices 10a, 10b and 10c. End 36a in Fig. 6 is hemispherical for example. End 36b in Fig. 7 is formed of a larger portion of a sphere, and end 36c in Fig. 8 is abruptly cut off at circumferential protuberance 22c.

Fig. 9 shows a protuberance 22d which is formed by a ring 22d formed or pressed upon a straight-sided smaller diameter shank section 27d.

In Fig. 10, protuberance 22e is formed by a ring-shaped array of arcuate segments 40 disposed approximately at the mid-point of smaller diameter shank section 27e. This illustrates that an operative protuberance need not be continuous as long as sufficient area of contact is provided for adequate and convenient engagement with a rotating holder such as a four-jawed chuck 14.

The centering procedure is extremely simple. Device 10 is secured within rotating chuck or holder 14 under ordinary pressure, and micro drill 12 is likewise secured within chuck 20. The drill is then rotated and light pressure applied, for example, by a pencil point 42 (Fig. 1) to true up the drill. The hole is then drilled without further adjustment or tightening.

What is claimed is:

1. A device for mounting and centering a micro drill in a rotating holder comprising an exposed shank, a chuck disposed at one end of said shank for holding the blunt end of said micro drill, an exposed circumferential protuberance adjacent the other end of said shank which is insertable into said rotating holder, said protuberance providing sufficient area of contact between said shank and said rotating holder to drive said micro drill under load, and said protuberance projecting outwardly from said shank a distance sufficient to permit said device to pivot about it within said rotating holder upon the application of a lateral force to the lower portion of said device to center said drill.

2. A device as set forth in claim 1 wherein said protuberance is comprised of a circumferential bulge near the end of said shank, said shank tapering down adjacent said bulge to a smaller diameter root, and said root diameter is large enough to prevent the end of said shank from passing through said rotating holder when said device is pivoted.

3. A device as set forth in claim 1 wherein said shank is comprised of a larger diameter section for receiving and mounting said micro drill chuck and a smaller diameter section for mounting said device within said rotating holder.

4. A device as set forth in claim 3 wherein said chuck includes a jawed assembly and a closing ring, said larger diameter section includes a central bore for receiving said jawed assembly and its outer surface is threaded for mounting said closing ring.

5. A device as set forth in claim 4 wherein said jawed assembly is comprised of a collet, and said closing ring is comprised of a collet closing ring.

6. A device as set forth in claim 3 wherein the diameter of said protuberance is greater than the diameter of the largest micro drill to be held in said device.

7. A device as set forth in claim 3 wherein said smaller diameter section tapers from a root diameter of approximately ⅛ inch to a diameter at said protuberance of approximately 5/32 inch.

8. A device as set forth in claim 7 wherein said shank tapers from said protuberance to said root in approximately ¼ inch.

9. A device as set forth in claim 6 wherein the distance between said protuberance and the chuck end of said device is approximately 1½ inches and more to permit the tip of said drill to be centered while a condition of eccentricity exists at said protuberance.

10. A device as set forth in claim 3 wherein said protuberance is disposed approximately at the center of said smaller diameter section.

11. A device as set forth in claim 1 wherein said protuberance is comprised of a curved bulge.

12. A device as set forth in claim 1 wherein said protuberance is disposed at the end of said shank.

13. A device as set forth in claim 1 wherein said protuberance is continuous about the periphery of said shank.

14. A device as set forth in claim 1 wherein said protuberance is interrupted by slots spaced about its periphery.

15. A device as set forth in claim 1 wherein the plane including the high point of said protuberance is substantially perpendicular to the longitudinal axis of said shank.

References Cited in the file of this patent

UNITED STATES PATENTS

| | | |
|---|---|---|
| 2,508,459 | Hoffsommer | May 23, 1950 |
| 2,577,556 | Williams | Dec. 4, 1951 |
| 2,675,242 | Olson | Apr. 13, 1954 |